United States Patent [19]

Haupt

[11] Patent Number: 4,524,634
[45] Date of Patent: Jun. 25, 1985

[54] TRANSMISSION SHIFTING MECHANISM
[75] Inventor: Robert C. Haupt, West Allis, Wis.
[73] Assignee: Allis-Chalmers Corp., Milwaukee, Wis.
[21] Appl. No.: 465,157
[22] Filed: Feb. 9, 1983
[51] Int. Cl.³ .............................................. G05G 9/16
[52] U.S. Cl. .............................. 74/473 R; 74/471 XY; 74/473 P; 74/501 R
[58] Field of Search .......... 74/471 XY, 473 R, 473 P, 74/475, 476, 477, 501 R

[56] References Cited

U.S. PATENT DOCUMENTS

| 2,951,393 | 9/1960 | Schroeder et al. | 74/473 R |
|---|---|---|---|
| 3,413,870 | 12/1968 | Spease, Jr. | 74/475 |
| 3,786,689 | 1/1974 | Houk | 74/471 XY |
| 4,143,560 | 3/1979 | Kinkade et al. | 74/473 R |

FOREIGN PATENT DOCUMENTS

| 638451 | 3/1962 | Canada | 74/473 R |
|---|---|---|---|
| 946867 | 12/1948 | France | 74/473 R |

Primary Examiner—Allan D. Herrmann
Attorney, Agent, or Firm—Charles L. Schwab

[57] ABSTRACT

A transmission shift mechanism including a shift selector lever mounted on a spherical bearing and a shifting segment mounted on a transverse axis and having a transverse slot receiving said shift selector lever for allowing said lever to pivot transversely for selecting a speed ratio and pivoting fore and aft for shifting said transmission.

3 Claims, 7 Drawing Figures

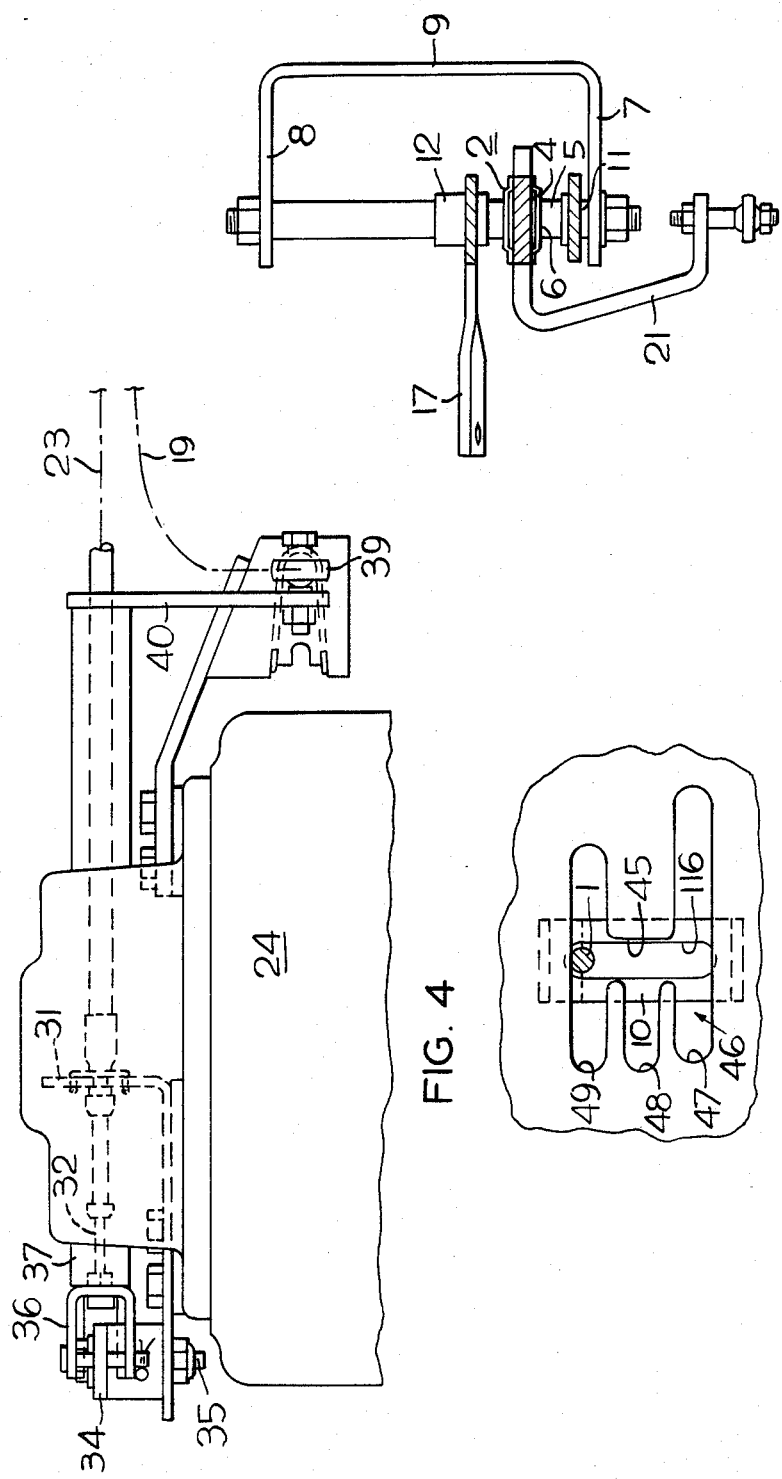

TRANSMISSION SHIFTING MECHANISM

This invention relates to a transmission shift mechanism and more particularly to a shift selector lever mounted on a universal bearing and an interconnected shifting segment having a transverse slot receiving said shift selector lever for allowing lateral movement of said shift selector lever to select a speed ratio and for shifting said transmission by pivoting said shifting segment fore and aft.

Multiple speed mechanically shifted transmissions are generally shifted by a lever pivotally mounted on the transmission cover. The shift lever is allowed to pivot transversely to select a shift rail and to pivot fore and aft to reciprocate the shift rail for shifting of the selected gear ratio. While this arrangement is acceptable for smaller tractors and tractors without a cab or platform, positioning of the shift lever in the middle of the operator station can be objectionable in the larger vehicles where the control console is arranged to the side of the operator. This allows space in front of the operator to operate foot pedals and other controls on the dashboard. Accordingly, an offset arrangement for the shift lever and park lock lever provides a more convenient arrangement for controlling the tractor. Accordingly, the applicant has provided for a shift lever mounted on a spherical bearing in the control console on the side of the operator. A shifting segment formed by a bracket pivoting on a transverse axis operates in conjunction with the shift selected lever. The shift selector lever selectively engages a shift rail by pivoting transversely on fore and aft axis and the shifting segment in combination with the shift selector lever pivots fore and aft to selectively engage the selected gear ratio. The shifting mechanism operates through cables from the control console to the shift rails for selective shifting of the transmission.

The Hegemann patent, U.S. Pat. No. 4,104,982 and the Kreitzberg et al patent, U.S. Pat. No. 4,137,791 show shifting mechanisms which are positioned in a control console for operating a vehicle transmission. The control lever carries a knob which can be rotated to select a shift rail and the lever can be pivoting fore and aft to shift the selected shift rail and thereby shift the transmission. The applicant's invention has provided for a control whereby the shift lever is pivoted transversely to selectively engage a shift rail and a shifting segment combined with the shift lever is then pivoted fore and aft to selectively engage the gear ratio.

It is an object of this invention to provide a shifting mechanism for a vehicle transmission having a shift selector lever and a shifting segment for shifting of the transmission.

It is another object of this invention to provide a shifting mechanism having a shift selector lever and a shifting segment operating through a shifting linkage to shift a vehicle transmission.

It is a further object of this invention to provide a shifting mechanism having a shift selector lever and a shifting segment for operating a cable mechanism between the control console and the transmission for shifting a vehicle transmission.

The objects of this invention are accomplished in a shifting mechanism including a control console for mounting at the operator station having a shift selector lever mounted on a spherical bearing operating in conjunction with a shifting segment mounted on a transverse axis to pivot fore and aft for selectively shifting the transmission. The shift selector lever is pivoted transversely in a slot of the shifting segment to selectively engage a shift rail while the shift selector lever and the shifting segment are pivoted fore and aft to shift the selected shift rail to the desired speed ratio. A cable linkage is connected between the shift selector lever and the shifting segment and the vehicle transmission to selectively shift the transmission responsive to control of the shaft selector lever and a shifting segment at the operator station.

The preferred embodiment of this invention is illustrated in the attached drawings.

FIG. 3 is a cross-section view taken on line III—III of FIG. 2;

FIG. 4 is a rear elevation view of the vehicle transmission showing the transmission and force transmitting linkages for shifting the transmission;

FIG. 5 is a plan view of the gate plate for the shift control and control console;

Figures 1, 2:
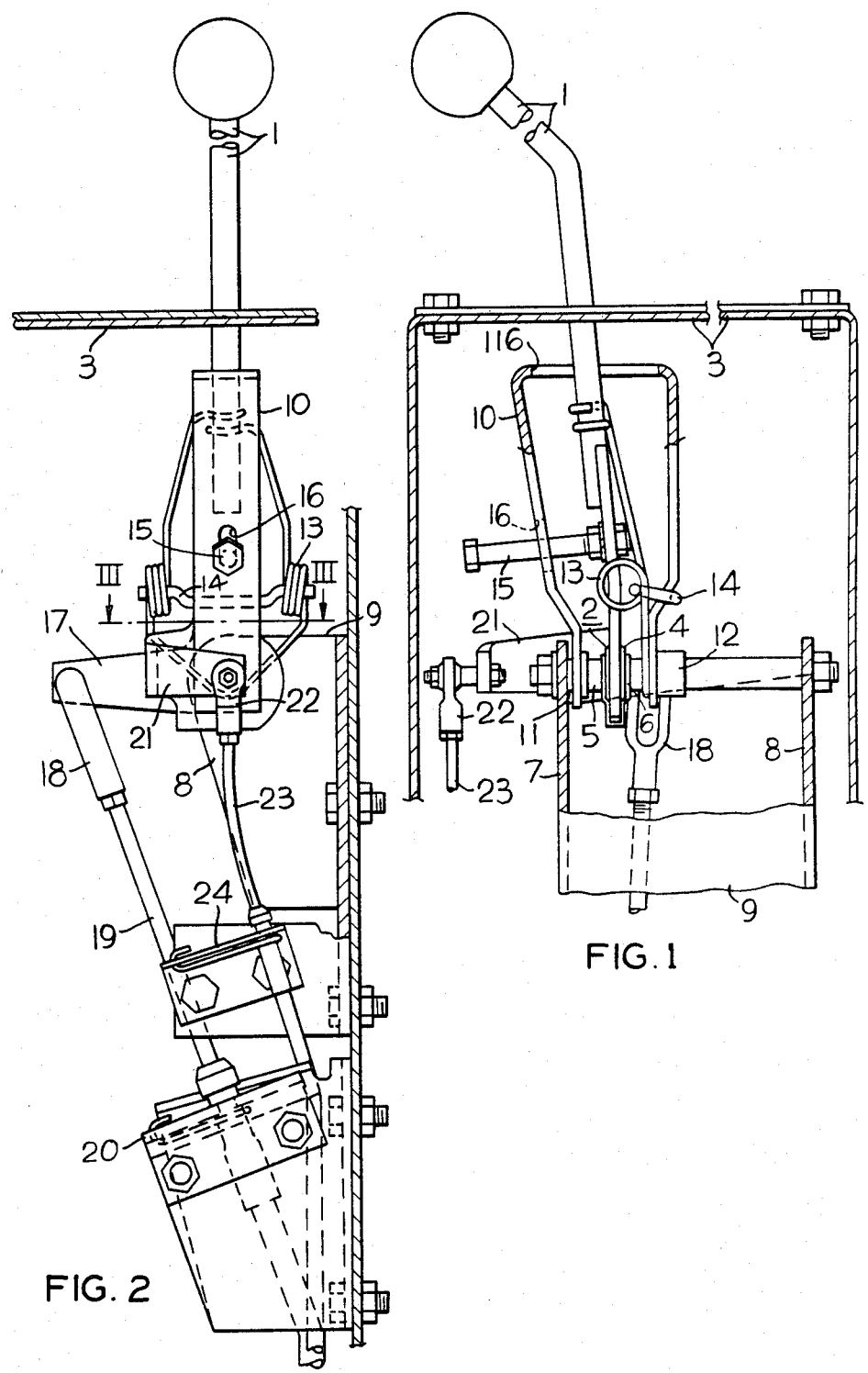
FIG. 1 illustrates a partially sectioned rear view of a transmission control in the control console.
FIG. 2 is a partially sectioned side elevation view of the transmission control in the control console shown in FIG. 1.

Referring to FIGS. 1 and 2, the shift selecting lever 1 is universally mounted on a spherical bearing 2 (in the control console 3). The spherical bearing 2 includes a spherical element 4 carried on the shaft 5 mounted within the bearing shell 6 on the lever 1. The shaft 5 is mounted on the uprights 7 and 8 formed on the bracket 9. The bracket 9 is mounted on the control console 3 as indicated in FIG. 2. The shifting segment 10 is an inverted U-shaped member having a horizontal portion presenting a transversely extending and vertically open slot 116 and having a pair of downwardly extending legs with bottom ends pivotally mounted on the bushings 11 and 12 which are carried on the shaft 5 and define a transverse axis. Spring 13 is carried on the shaft 5 and extends upwardly to embrace the lever 1. The clip 14 retains the spring on shifting segment 10 and normally biases the selector lever 1 to the right as viewed in FIG. 1.

A horizontally extending stabilizer finger 15 is rigidly secured to the shift selector lever 1 and extends through a vertically extending and transversely open slot 16 in one of the legs of the segment 10 to prevent rotation about a vertical axis. The transverse slot 116 in the shifting segment 10 permits pivotal movement of said shift selector lever 1 relative to said shifting segment 10 about a fore and aft axis and prevents relative pivotal movement therebetween about a transverse axis. The arm 17 of the shifting segment 10 is pivotally connected to a clevis 18 of the sheathed cable 19. The sheath of sheathed cable 19 is anchored to the bracket 20 to allow the cable to reciprocate within the sheath. Similarly the lever arm 21, which is an integral part of the shift selector lever 1, extends transversely to pivotally connect to the clevis 22 on the end of the sheathed cable 23. The sheath of the sheathed cable 23 is anchored on the anchor 24 and the cable reciprocates in and out of the sheath of the sheathed cable 23 to operate the shifting device on the transmission.

FIG. 5 illustrates the gate plate defining the motion of the shift selector lever 1 and the shifting segment 10.

Figure 6:
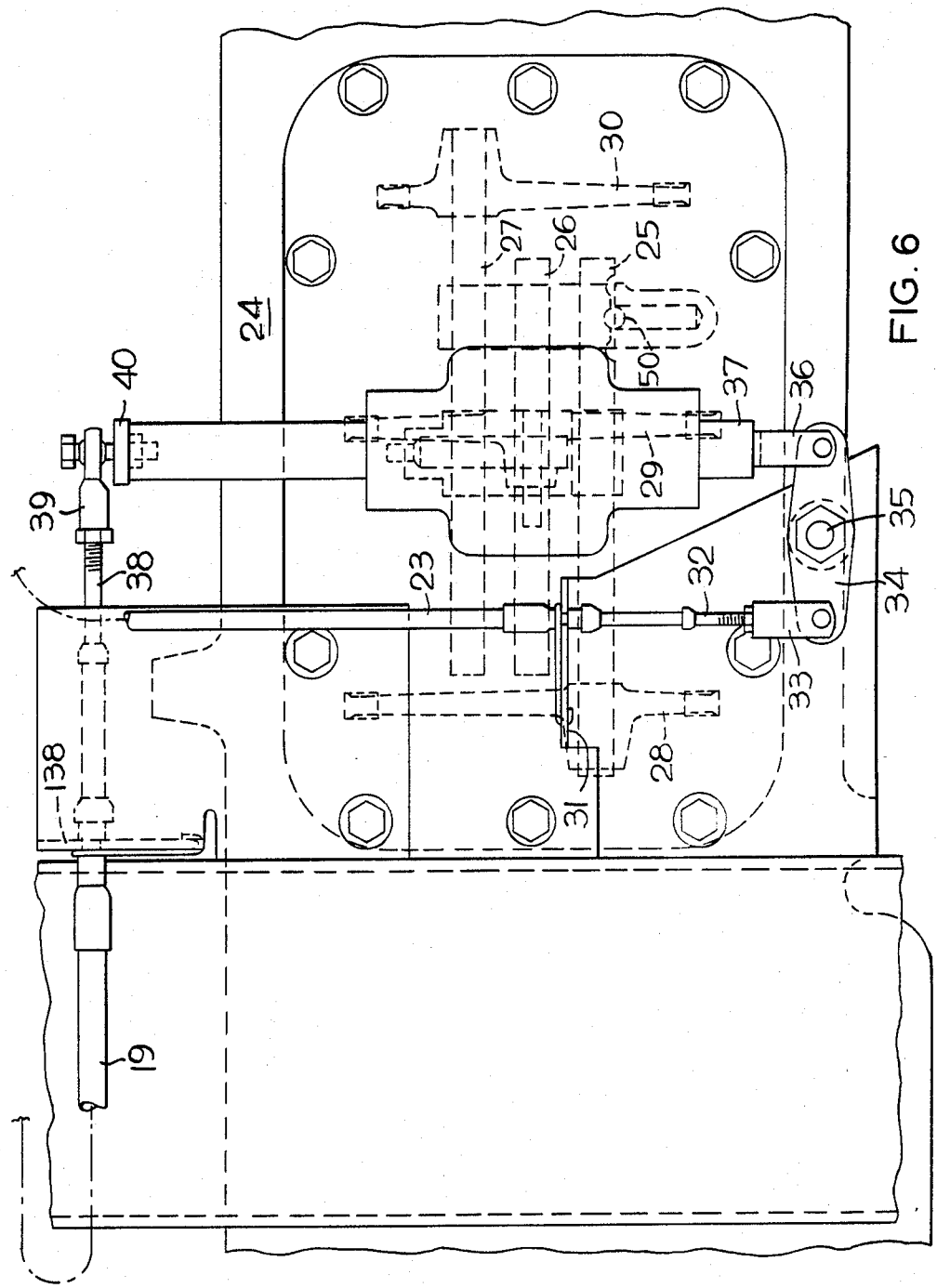
FIG. 6 is a plan view of the transmission and the force transmitting linkages to the transmission.
Figure 7:
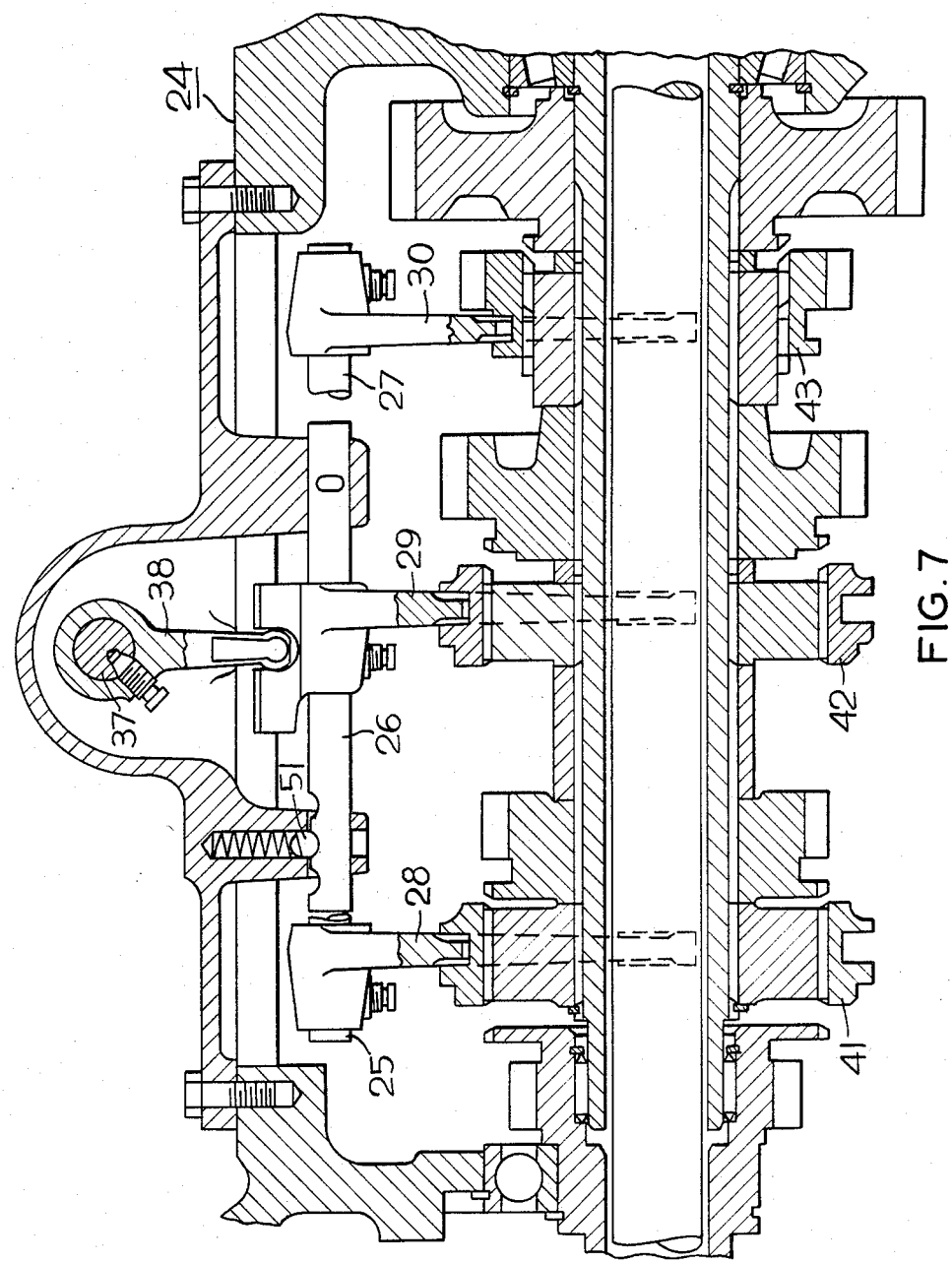
FIG. 7 is a cross-section view of the transmission showing the clutch collars, shift rails and shifting means.

FIGS. 4 and 6 illustrate the transmission 24. The transmission 24 includes plurality of shift rails 25, 26 and 27. Shift rail 25 carries a shift fork 28, shift rail 26 carries shift fork 29 and shift rail 27 carries shift fork 30. Sheathed cable 23 has a sheath that is anchored on the anchor 31 while the cable 32 extends to the clevis 33 which is pivotally connected to the lever 34. The lever 34 is pivotally mounted on the pin 35 and the opposite end of the lever 34 is pivotally connected to the clevis 36 on the end of the shaft 37 to reciprocate the shaft. The reciprocating of the shaft 37 selectively engages the shifting arm 38 which selects one of the shift rails 25, 26 or 27. Sheathed cable 19 includes the cable 38 which is connected through the clevis 39 to the arm 40 on the shaft 37. Sheath at sheathed cable 19 is anchored on anchor 138. Pivotal rotation of the shaft 37 reciprocates the selection of said shift rails 25, 26 or 27. This, in turn, operates the clutch collars 41, 42 or 43, so the clutch collars selectively engage gear teeth to engage the selected gear ratio.

Operation of the device will be described in the following paragraphs.

The shift selector lever 1 is normally biased to the right-hand end of the shift pattern of the gate plate as shown in FIG. 5 responsive to the biasing force of the spring 13. To selectively engage a shift rail by the shifting arm 38 the shift selector lever 1 is moved transversely in the neutral portion 45 of the shifting pattern slot 46. When the shifting arm 38 engages one of the shift rails 25, 26 or 27, it can be shifted fore and aft in one of the longitudinal portions 47, 48 or 49 of the shifting pattern slot 46. Moving the shifting segment 10 and shift selector lever 1 fore and aft selectively reciprocates one of the shift rails which in turn shifts one of the clutch collars 41, 42 or 43.

Shifting to another selected gear ratio is accomplished by shifting the lever 1 and shifting segment 10 to the neutral slot portion 45 and then shifting the shift selector arm 1 transversely to the slot to selectively engage any other shift rail and shift gear ratio. Suitable detents and interlocks are provided on the shift rails of which the detent 50 is shown. Interlocks between the shift rails are also provided to prevent shifting of no more than one shift rail at a time.

The embodiments of the invention in which an exclusive property or privilege is claimed are defined as follows:

1. A shift mechanism for shifting a vehicle transmission comprising a control console, a shift selector lever mounted on said control console for pivotal movement on a transverse axis and a fore and aft axis, an inverted U-shaped shifting segment having a horizontal portion and a pair of downwardly extending legs with their lower ends pivotally mounted on said console on said transverse axis, means defining a transversely extending slot in said horizontal portion through which said lever extends, said slot permitting relative movement between said selector lever and said shift selector lever about said fore and aft axis and preventing relative movement between said selector lever and said shifting segment about said transverse axis, means defining a vertically elongated slot in one of said legs of said shifting segment, a stabilizer finger rigidly secured to said selector lever and extending horizontally therefrom and through said vertically elongated slot, said slot and said stabilizer finger cooperating to prevent rotation of said lever about a vertical axis, a transmission including a plurality of shifting devices, a shift selector for selectively and alternatively engaging one of said shifting devices, a shift selector mechanism connected between said shift selector lever and said shift selector selectively engaging said shifting devices responsive to pivotal movement of said shift selector lever about said fore and aft axis, and a shifting mechanism connected between said shifting segment and said shift selector for selectively shifting said transmission responsive to pivotal movement of said shift selector lever and said shifting segment about said transverse axis.

2. A shift mechanism for shifting a vehicle transmission as set forth in claim 1 including, a spring interposed between said selector lever and one of said legs of said shifting segment normally biasing said shift selector lever transversely to a position at one end of said transversely extending slot.

3. A shift mechanism for shifting a vehicle transmission as set forth in claim 1 including, a spherical bearing supporting said shift selector lever.

* * * * *